US012636684B1

(12) United States Patent
    Rocha et al.

(10) Patent No.:    US 12,636,684 B1
(45) Date of Patent:        May 26, 2026

(54) LENS CLEANING SYSTEM

(71) Applicant: Tesla, Inc., Austin, TX (US)

(72) Inventors: Joao Nuno Rocha, Berlin (DE); Sean Corro, Burlingame, CA (US)

(73) Assignee: Tesla, Inc., Austin, TX (US)

( * ) Notice:    Subject to any disclaimer, the term of this patent is extended or adjusted under 35 U.S.C. 154(b) by 0 days.

(21) Appl. No.: 19/215,121

(22) Filed:    May 21, 2025

(51) Int. Cl.
    *B08B 3/02*        (2006.01)
    *B08B 1/14*        (2024.01)
    *H04N 23/50*      (2023.01)

(52) U.S. Cl.
    CPC ................ *B08B 3/02* (2013.01); *B08B 1/143* (2024.01); *H04N 23/50* (2023.01)

(58) Field of Classification Search
    CPC ........... B08B 3/02; B08B 1/143; H04N 23/50
    See application file for complete search history.

(56)            References Cited

U.S. PATENT DOCUMENTS

2011/0073142 A1*    3/2011    Hattori .................... B60S 1/481
                                                                                134/198
2012/0000024 A1*    1/2012    Layton .................. G03B 17/08
                                                                                15/97.1

2019/0016903 A1*    1/2019    Wong ........................ B32B 7/02
2020/0047719 A1*    2/2020    Park .......................... B08B 3/08
2021/0009085 A1*    1/2021    Alcaide Hernández ....................
                                                                                G01S 17/931
2023/0333366 A1*    10/2023    Nabavi .................... G02B 1/14
2023/0358869 A1*    11/2023    Wijntjes ................. G03B 17/08
2024/0067135 A1*    2/2024    Lee .......................... B60S 1/566
2024/0300447 A1*    9/2024    Wang .................... B60S 1/0411

* cited by examiner

*Primary Examiner* — Alexander Markoff

(74) *Attorney, Agent, or Firm* — Knobbe, Martens, Olson & Bear, LLP

(57)            ABSTRACT

A system may include a camera assembly, a fluid dispensing assembly, a wiper assembly, and a controller. The camera assembly can include a lens. The controller can be in communication with the camera assembly, the fluid dispensing assembly, and/or the wiper assembly. In some examples, the controller can be configured to determine, based on image quality data generated by the camera assembly, that a debris is attached to the lens. In response to determining that the debris is attached to the lens, the controller can trigger the fluid dispensing assembly to dispense liquid onto the lens, and activate the wiper assembly to remove the debris from the lens.

9 Claims, 7 Drawing Sheets

400

132

472

142

*600* LENS CLEANING PROCESS

*602* DETERMINE THAT A DEBRIS IS ATTACHED TO A LENS

*604* CAUSE LIQUID TO BE DISPENSED TO THE LENS

*606* CAUSE A FIRST WIPER BLADE TO MOVE ACROSS THE LENS TO REMOVE THE DEBRIS

LENS CLEANING SYSTEM

TECHNICAL FIELD

The present disclosure relates to systems and methods for cleaning imaging systems. More particularly, some embodiments of the present disclosure relate to systems and mechanisms for cleaning lenses of camera assemblies.

BACKGROUND

Some devices, including automotive sensors, surveillance cameras, and industrial imaging systems, operate under conditions where contaminants can adversely affect their performance. In these applications, maintaining clean optical surfaces can be critical for ensuring accurate image capture and reliable system performance. It may be desirable to provide effective lens cleaning mechanisms for imaging systems.

SUMMARY

The systems, methods, and devices described herein each have several aspects, no single one of which is solely responsible for its desirable attributes. Without limiting the scope of this disclosure, several non-limiting features will now be described briefly.

In some aspects, the techniques described herein relate to a system including: a camera assembly including a lens; a fluid dispensing assembly; a wiper assembly; and a controller in communication with the camera assembly, the fluid dispensing assembly, or the wiper assembly, the controller configured to: trigger the fluid dispensing assembly to dispense liquid onto the lens; and activate the wiper assembly to remove a debris from the lens.

In some aspects, the techniques described herein relate to a system, wherein the liquid includes oil, wherein the wiper assembly includes a first wiper blade and a second wiper blade, and wherein activating the wiper assembly includes: cause the first wiper blade to move across the lens to remove the debris prior to triggering the fluid dispensing assembly; and cause the second wiper blade to move across the lens to remove excess oil following dispensing the liquid onto the lens.

In some aspects, the techniques described herein relate to a system, further including: a housing configured to house the lens, wherein the housing provides a ramp to enable the first wiper blade and the second wiper blade to smoothly move across the lens.

In some aspects, the techniques described herein relate to a system, wherein the first wiper blade and the second wiper blade rotate along a rotation axis in either a clockwise direction or a counter-clockwise direction.

In some aspects, the techniques described herein relate to a system, wherein the controller is further configured to close the housing to cover the lens while the first wiper blade or the second wiper blade moves across the lens.

In some aspects, the techniques described herein relate to a system, further including an environment sensor configured to detect an environment associated with the lens to generate a sensor signal, and wherein the controller is further configured to: determine, based on the sensor signal, that the lens is prone to foreign object contact; and in response to determining that the lens is prone to foreign object contact: cause the first wiper blade to move across the lens; and close the housing to cover the lens.

In some aspects, the techniques described herein relate to a system, wherein the first wiper blade includes thermoplastic polyurethane (TPU).

In some aspects, the techniques described herein relate to a system, wherein the fluid dispensing assembly includes: a reservoir configured to store the liquid; a tube; and a nozzle in fluid communication with the reservoir through the tube, the nozzle configured to spray the liquid onto the lens.

In some aspects, the techniques described herein relate to a system, wherein the controller is further configured to: determine, based on image quality data generated by the camera assembly, that a debris is attached to the lens, wherein the controller triggers the fluid dispensing assembly and activates the wiper assembly in response to determining that the debris is attached to the lens.

In some aspects, the techniques described herein relate to a system, wherein the liquid includes oil, lubricant, alcohol-based solution, or washing fluid.

In some aspects, the techniques described herein relate to a method for cleaning a lens of a camera assembly, the method including: determining, based on image quality data generated by the camera assembly, that a debris is attached to the lens; and in response to determining that the debris is attached to the lens: causing liquid to be dispensed onto the lens; and causing a first wiper blade to move across the lens to remove the debris.

In some aspects, the techniques described herein relate to a method, wherein the first wiper blade moves across the lens prior to the liquid being dispensed onto the lens.

In some aspects, the techniques described herein relate to a method, wherein the liquid includes oil, the method further including: causing a second wiper blade to move across the lens to remove excess oil following the liquid being dispensed onto the lens.

In some aspects, the techniques described herein relate to a method, further including: determining, based on a first sensor signal indicative of an environment associated with the lens, that the lens is prone to foreign object contact; and in response to determining that the lens is prone to foreign object contact: causing the first wiper blade to move across the lens; and closing a housing that houses the lens to cover the lens.

In some aspects, the techniques described herein relate to a method, further including: determining, based on a second sensor signal indicative of the environment associated with the lens, that the lens is no longer prone to foreign object contact; and in response to determining that the lens is no longer prone to foreign object contact: causing the second wiper blade to move across the lens; and opening the housing to uncover the lens.

In some aspects, the techniques described herein relate to a method, wherein the first wiper blade and the second wiper blade rotate along a rotation axis in either a clockwise direction or a counter-clockwise direction.

In some aspects, the techniques described herein relate to a method, wherein the first wiper blade and the second wiper blade rotate along the rotation axis by about 180 degrees.

In some aspects, the techniques described herein relate to a method, wherein the first wiper blade and the second wiper blade move across a ramp prior to moving across the lens.

In some aspects, the techniques described herein relate to a method, wherein causing the first wiper blade to move across the lens includes actuating a motor to move the first wiper blade across the lens.

In some aspects, the techniques described herein relate to a method, wherein causing the liquid to be dispensed onto the lens includes: pressurizing a reservoir that stores the liquid to release the liquid into a tube in fluid communication with a nozzle for spraying the liquid onto the lens.

Various combinations of the above and below recited features, embodiments, and aspects are also disclosed and contemplated by the present disclosure.

Additional embodiments of the disclosure are described below in reference to the appended claims, which may serve as an additional summary of the disclosure.

BRIEF DESCRIPTION OF THE DRAWINGS

These and other features, aspects, and advantages of the disclosure are described with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

Embodiments of the present disclosure are described with reference to the accompanying drawings, in which like reference characters reference like elements, and wherein.

DETAILED DESCRIPTION

Figure 1:
FIG. 1 illustrates a perspective view of a lens cleaning system with certain parts removed and certain parts exposed to reveal some internal structures in accordance with some embodiments of the present disclosure.

Generally described, one or more aspects of the present disclosure relate to systems and methods for directly cleaning a lens of a camera assembly using wiper blades and/or cleaning fluid. More specifically, some embodiments of the present disclosure disclose systems and methods that can maintain cleanliness and image quality associated with the lens of the camera assembly by using wiper blades and/or cleaning fluid to remove contaminants or debris attached to the lens, thereby advantageously eliminating the need for protective covering such as dome glasses.

Imaging systems, such as those used in vehicles, may be exposed to environmental conditions that can lead to the accumulation of dust, moisture, and other contaminants or debris on their optical components (e.g., lenses). This accumulation can impact the performance and clarity of captured images, which is important for applications like automotive sensors, surveillance cameras, and industrial imaging systems. Maintaining clean optical surfaces may be desirable for ensuring accurate image capture and reliable system performance.

Existing methods for maintaining clear optical surfaces often involve the use of protective coverings, such as dome glasses, or manual cleaning procedures. While dome glasses can provide a barrier against contaminants, dome glasses can add to the optical stack, which can result in image distortion. Additionally, dome glasses can lead to increased overall product volume or cost. Manual cleaning procedures, on the other hand, can be labor-intensive or less efficient, and may not be feasible in some situations.

To address at least a portion of the above problems, some embodiments of the present disclosure disclose systems and methods for cleaning camera lenses without the need for dome glasses, thereby advantageously reducing image distortion and product volume. In the context of imaging systems, dome glasses can refer to protective, transparent coverings that are placed over a camera lens to shield it from environmental contaminants such as dust, moisture, and debris. These dome glasses can be typically external to a camera assembly and serve as a barrier between a camera lens and the surrounding environment. While a camera lens itself may have a dome-like shape, the camera lens can be distinct from the concept of dome glasses as described here. Advantageously, the present invention can specifically avoid the use of additional dome glasses for cleaning purposes. Instead, a lens cleaning system can be designed to clean a camera lens without using an additional dome glass.

In some embodiments, a lens cleaning system (or simply referred to as a system) can integrate a wiper assembly to effectively clean a camera lens surface. In some embodiments, the system can incorporate a fluid dispensing assembly that applies liquid (e.g., a thin layer of oil and/or cleaning fluid) to the lens, thereby preventing debris from adhering to the surface. Additionally, the system can optionally utilize a design that includes a housing with ramps to facilitate the movement of wiper blades across the lens. Advantageously, the system can ensure that the lens remains clean and free from contaminants, maintaining high image quality and system performance and reliability.

In some implementations, a system for cleaning a lens can include a camera assembly, a fluid dispensing assembly, a wiper assembly, and a controller. The camera assembly can include the lens. The controller can be in communication with the camera assembly, the fluid dispensing assembly, and the wiper assembly. The controller can be configured to determine, based on image quality data generated by the camera assembly, that a debris is attached to the lens. In response to determining that the debris is attached to the lens, the controller can trigger the fluid dispensing assembly to dispense a liquid onto the lens, and/or activate the wiper assembly to remove the debris from the lens.

Although the various aspects will be described in accordance with illustrative embodiments and combination of features, one skilled in the relevant art will appreciate that the examples and combination of features are illustrative in nature and should not be construed as limiting. More specifically, aspects of the present application may be applicable with various types of imaging systems, cameras, lens, optical surfaces under different contexts, such as when used in vehicles, inside or outside buildings, or the like. Still further, although specific architectures, structures, or components of lens cleaning systems for cleaning lenses of camera assemblies will be described, such illustrative lens cleaning system design or architecture should not be construed as limiting. Accordingly, one skilled in the relevant art will appreciate that the aspects of the present application are not necessarily limited to application to any particular types of camera assemblies, lens cleaning infrastructure, advanced driver-assistance systems (ADAS), vehicles, or illustrative interactions between various parts of lens cleaning systems.

FIG. 1 illustrates a perspective view of a lens cleaning system 100 with certain parts removed and certain parts exposed to reveal some internal structures in accordance with some embodiments of the present disclosure. As shown in FIG. 1, the lens cleaning system 100 can include a camera assembly 140, a reservoir 112, a tube 114, a nozzle 202, a motor 122, a wiper blade 124, a wiper blade 126, a housing 132, and a controller 150. The lens cleaning system 100 can comprise one or more of the wiper blades 124, 126. The camera assembly 140 can include a lens 142. The lens 142 can be at least partially housed within the housing 132. The reservoir 112, the tube 114, and the nozzle 202 can form at least a portion of a fluid dispensing assembly. The motor 122, the wiper blade 124, and the wiper blade 126 can form at least a portion of a wiper assembly. The controller 150 can be in communication with the camera assembly 140, the fluid dispensing assembly (e.g., the reservoir 112, the tube 114, and the nozzle 202), and/or the wiper assembly (e.g., the motor 122, the wiper blade 124, and the wiper blade 126) to advantageously maintain the cleanliness of the lens 142 (e.g., when the lens cleaning system 100 is operating in environments where debris or contaminants are present).

In some examples, the reservoir 112 can store liquid used for cleaning the lens 142. The liquid stored by the reservoir 112 can include oil, lubricant, alcohol-based solutions, washing fluid, cleaning fluid, and/or the like. For example, the reservoir 112 can be designed to hold a sufficient quantity of oil to enable continual operation of the lens cleaning system 100 without the need for frequent refills. In operation, the reservoir 112 can be pressurized (e.g., caused by the controller 150 through a pressure tool) to facilitate the release of the liquid from the reservoir 112 into the tube 114. The tube 114 can connect the reservoir 112 to the nozzle 202. The tube 114 can enable transfer of the liquid stored in the reservoir 112 to the nozzle 202 for dispensing the liquid onto the lens 142.

In some examples, the lens cleaning system 100 can include two or more separate reservoirs to facilitate a multi-step cleaning process. Each reservoir can be configured to store a specific type of liquid, enabling the lens cleaning system 100 to perform sequential cleaning and protective operations. For example, a first reservoir can be configured to store a solvent-based cleaning fluid, such as a washing fluid or alcohol-based solution. This solvent can be dispensed first to remove debris, dirt, or other contaminants from a surface of the lens 142. A second reservoir can be configured to store a lubricant, such as oil, which is applied after the solvent-based cleaning step. The oil can create a thin, uniform protective layer on the lens surface, reducing the adherence of future debris and contaminants. Additionally and/or optionally, a fluid dispensing assembly (e.g., the reservoir 112, the tube 114, and the nozzle 202), can include a spray mechanism to facilitate even and controlled application of the cleaning fluids.

In some examples, the motor 122 is configured to drive the wiper blade 124 and the wiper blade 126 to move across the lens 142. For example, the motor 122 can be equipped with a worm gear for precision and position locking, thereby enabling the wiper blades 124 and 126 to move accurately and efficiently. Additionally, and/or optionally, the motor 122 can be designed to operate at high speeds, enabling quick cleaning cycles that reduce or minimize downtime for the camera assembly 140. For example, the motor 122 can operate at 12,000 revolutions per minute (RPM) with a gear ratio of 71:1. In this example, the motor 122 can drive the wiper blade 124 and the wiper blade 126 to complete a single rotation across the lens 142 within 0.355 seconds. As such, the motor 122 can enable the lens cleaning system 100 to complete a process for cleaning the lens 142 in about or less than 1 second or less than half a second. By integrating the motor 122 with the wiper blades 124 and 126, the process for cleaning the lens 142 can be advantageously synchronized with the dispensing of the liquid through the nozzle 202, thereby enabling effective removal of debris from the lens 142.

The wiper blade 124 and the wiper blade 126 can be configured to (e.g., be driven by the motor 122 according to a control signal generated by the controller 150) move across the lens 142 to at least remove debris and contaminants. The wiper blade 124 and the wiper blade 126 can be made of thermoplastic polyurethane (TPU), which provides flexibility and durability. The wiper blade 124 and/or the wiper blade 126 can be shaped according to the surface of the lens 142 for effectively removing debris without causing damage to the lens 142. In some examples, the wiper blade 124 can be caused to move across the lens 142 to remove debris (e.g., larger particles) and prepare the lens 142 for the application of liquid (e.g., oil). Following the application of the oil, the wiper blade 126 can be caused to move across the lens 142, thereby ensuring that any remaining debris or excess oil is removed to maintain the clarity and performance of the lens 142.

In some examples, the housing 132 can serve as the protective enclosure for the lens cleaning system 100 by housing the camera assembly 140, the wiper blades 124 and 126, and/or other components. For example, the housing 132 can offer protection against environmental factors such as dust and moisture, which could otherwise compromise the performance of the lens cleaning system 100. In other words, the housing 132 can be positioned such that it forms a protective barrier between the lens 142 and the outside environment. In some examples, housing 132 may not be opaque and therefore acts as a hindrance to camera functionality when in the closed position. In some examples, the housing 132 can be configured to close and cover the lens 142 during certain cleaning operations, thereby further enhancing the system's ability to maintain lens cleanliness and integrity. For example, the housing 132 can be equipped with an actuation mechanism, such as a motorized hinge, sliding mechanism, or spring-loaded cover, that enables the housing 132 to move into a closed position over and/or to cover the lens 142. The actuation mechanism can be controlled by the controller 150, which can determine when the housing 132 should be closed based on environmental conditions and/or stages associated with a cleaning process. In some examples, the controller 150 may close or cause closure of the housing 132 while the wiper blades 124 and 126 are rotating across the lens 142 to prevent additional debris from entering the cleaning area.

As noted above, the camera assembly 140 can include at least the lens 142. In some examples, the camera assembly 140 can be in communication with the controller 150. The controller 150 can monitor image quality data generated by the camera assembly 140 to determine whether the lens 142 needs to be cleaned. The lens 142 can be the optical surface that the lens cleaning system 100 is designed to clean. The lens 142 can be exposed to environmental conditions that can lead to the accumulation of debris and contaminants, which can impact image quality associated with the camera assembly 140. The controller 150 can be embodied as a microcontroller unit (MCU), a microprocessor, central processing unit (CPU), digital signal processor (DSP), microcontroller, or other processor or processing/controlling circuit. The controller 150 can be integrated as a part of the camera assembly 140 or disposed external to the camera assembly 140.

In some examples, the controller 150 can be configured to determine whether debris is attached to the lens 142 based on image quality data generated by the camera assembly 140. The image quality data can include information derived from analyzing images captured by the camera assembly 140 through the lens 142. The image quality data can indicate sharpness and clarity (e.g., measuring how clear, well-defined, or blurred the images are), contrast and brightness (e.g., measuring the difference between light and dark areas in an image), color accuracy (e.g., assessing whether colors in an image are true to life), noise levels (e.g., representing amount of random variation or graininess in an image), focus (e.g., determining whether there are out-of-focus images that can be caused by debris on the lens 142), and/or the like associated with the images captured by the camera assembly 140. Based on the image quality data, the controller 150 can determine that the lens 142 needs to be cleaned (e.g., debris is attached to the lens 142).

In response to determining that the debris is attached to the lens 142, the controller 150 can trigger the reservoir 112, the tube 114, and/or the nozzle 202 to dispense liquid onto the lens 142. The controller 150 can also activate the motor 122 to drive the wiper blade 124 and the wiper blade 126 to remove the debris from the lens 142.

Figure 2:
FIG. 2 illustrates a cross-section view of the lens cleaning system of FIG. 1 with certain parts further removed to reveal some internal structures in accordance with some embodiments of the present disclosure.

FIG. 2 illustrates a perspective view of the lens cleaning system 100 with certain parts further removed to reveal some internal structures in accordance with some embodiments of the present disclosure. As shown in FIG. 2, the lens cleaning system 100 can include the lens 142, the tube 114, the nozzle 202, the wiper blade 124, the wiper blade 126, the housing 132 and a ramp 204. The ramp 204 can be provided by the housing 132. FIG. 2 further shows a lens axis 292, a rotation axis 282, and a rotation direction 440. The lens axis 292 can be an imaginary line that passes through the center of the lens 142. The lens axis 292 can be perpendicular to a surface of the lens 142, and can represent the optical centerline of the lens 142.

In some examples, in response to determining that the lens 142 needs to be cleaned (e.g., debris is attached to the lens 142), the controller 150 can cause the wiper blade 124 to move across the lens 142 to remove the debris. In some examples, the wiper blades 124 and 126 can be designed as one-way wipers (e.g., for cleaning effectively through a single direction of movement). This single direction of movement or unidirectional cleaning prevents contaminants from being redistributed across the lens 142, thereby maintaining a clean and clear optical surface. Additionally, the single direction of movement can ensure that oil is distributed as a thin, uniform layer, rather than pooling or streaking, thereby creating a protective barrier on the lens 142 and reducing the adherence of future debris and contaminants on the lens 142. For example, the controller 150 can cause the wiper blade 124 and the wiper blade 126 to rotate along the rotation axis 282 in the rotation direction 440 by 180 degrees. Although the rotation direction 440 indicates a counter-clockwise rotation, it should be noted that the rotation direction 440 can be clockwise in other embodiments of the present disclosure. Through rotation along the rotation axis 282, the wiper blade 124 can move across the lens 142 to remove debris on the lens 142. The controller 150 can further trigger (e.g., through causing pressure to be applied to the reservoir 112) the nozzle 202 to dispense oil stored in the reservoir 112 onto the lens 142. Following dispensing the oil onto the lens 142, the controller 150 can cause the wiper blade 126 and the wiper blade 124 to rotate along the rotation axis 282 in the rotation direction 440 by 180 degrees. As such, the wiper blade 126 can remove excess oil and/or remaining debris on the lens 142.

During movement of the wiper blade 124 and the wiper blade 126, the ramp 204 can facilitate smooth and effective rotation of the wiper blade 124 and the wiper blade 126. For example, the ramp 204 can provide a smooth transition surface that guides and enables the wiper blade 124 and the wiper blade 126 to move onto and across the lens 142. Advantageously, by providing the smooth transition surface, the ramp 204 can help prevent the wiper blade 124 and the wiper blade 126 from getting stuck in any surface discontinuities during movement. Additionally, the design associated with the ramp 204 can enable the use of standard lenses without the need for redesigning a lens cleaning system from scratch or a customized design associated with the lens 142, which can lower the cost associated with assembly and manufacturing.

In some examples, while the wiper blade 124 and the wiper blade 126 rotate across the lens 142, the controller 150 can cause the housing 132 to close to cover the lens 142. For example, the housing 132 can be designed to rotate and stop in a specific position to form a protective barrier between the camera lens 142 and the external environment of the lens cleaning system 100. By closing the housing 132, the lens cleaning system 100 can prevent additional debris, dust, and/or moisture from attaching to the lens 142, thereby ensuring that the cleaning process is not compromised by new contaminants. Additionally, by covering the lens 142, the lens cleaning system 100 can enable the wiper blade 124 and the wiper blade 126 to operate without interference from external environments during cleaning. This can improve the efficiency of the cleaning process. In other examples, the lens cleaning system 100 can utilize a wiper assembly (e.g., the wiper blades 124 and 126) to cover the lens 142, without using the housing 132 to cover the lens 142. For example, the controller 150 can cause the wiper blades 124 and 126 to move to form a protective barrier over the lens 142 (e.g., without using a separate enclosure such as the housing 132 to cover the lens 142). As another example, the controller 150 can activate the wiper assembly to rotate the wiper blade 124 and/or the wiper blade 126 into a position to cover the lens 142.

Figure 3:
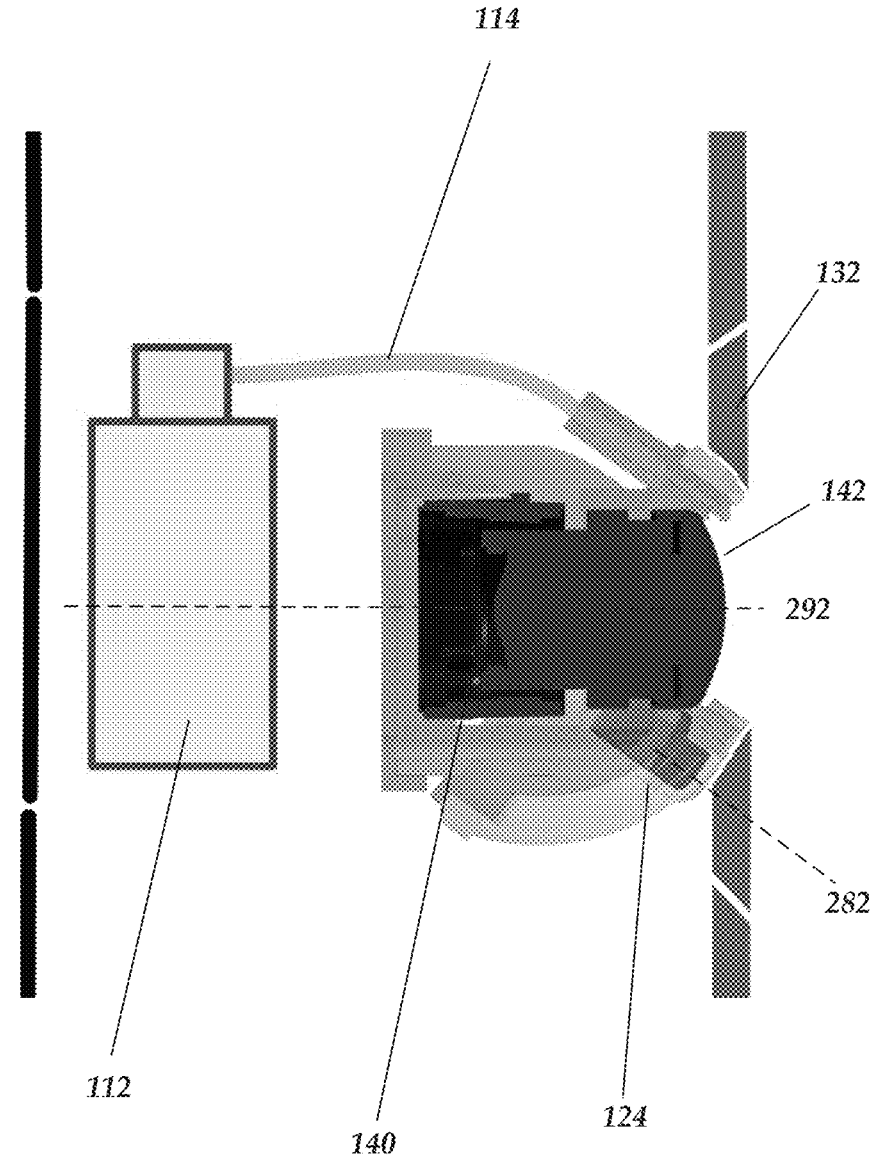
FIG. 3 illustrates a cross-sectional view of the lens cleaning system of FIG. 1 in accordance with some embodiments of the present disclosure.

FIG. 3 illustrates a cross-sectional view of the lens cleaning system 100 in accordance with some embodiments of the present disclosure. As shown in FIG. 3, the lens cleaning system 100 includes the reservoir 112, the tube 114, the lens 142, the housing 132, the camera assembly 140, the wiper blade 124. FIG. 3 also shows the lens axis 292 and the rotation axis 282 as described above with reference to FIG. 2.

In some examples, the lens cleaning system 100 can initiate a lens protection process to protect the lens 142 from being damaged by foreign object(s). For example, the lens cleaning system 100 can include an environment sensor (not shown in FIG. 3) configured to detect an environment associated with the lens 142 to generate a sensor signal. The sensor signal can indicate that the lens 142 is prone to foreign object contact. For example, the sensor signal can indicate that the lens 142 is prone to rock chipping when a vehicle that includes the lens cleaning system 100 is travelling over a rough road or under high speed. Based on the sensor signal, the controller 150 can determine that the lens 142 is prone to impact by foreign objects (e.g., little rocks). In response to determining that the lens 142 is prone to foreign object contact, the controller 150 can cause the wiper blade 124 to move across the lens 142 for wiping any debris attached to the lens 142. Additionally and/or optionally, the controller 150 can cause the housing 132 to close and cover the lens 142, thereby protecting the lens 142 from being impacted by foreign objects.

Figure 4A:
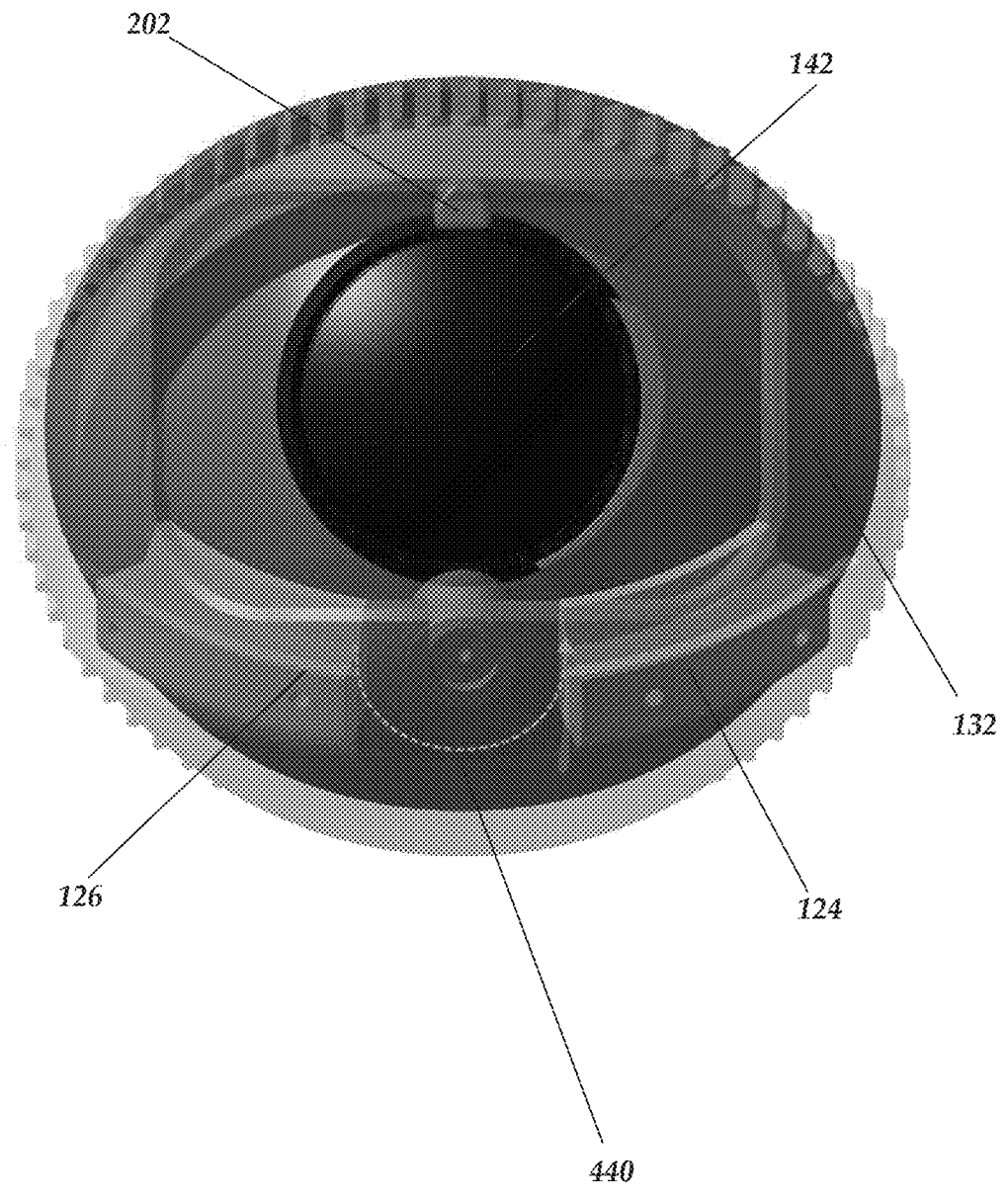
FIG. 4A illustrates an enlarged view showing portions of the lens cleaning system of FIG. 1 in accordance with some embodiments of the present disclosure.

FIG. 4A illustrates an enlarged view showing portions of the lens cleaning system 100 in accordance with some embodiments of the present disclosure. As shown in FIG. 4A, the lens cleaning system 100 includes the nozzle 202, the lens 142, the wiper blade 124, the wiper blade 126, and the housing 132. FIG. 4A also shows the rotation direction 440 along which the wiper blade 124 and the wiper blade 126 can rotate. As noted above, the lens cleaning system 100 (e.g., the controller 150) can optionally close the housing 132 to partially or fully cover the lens 142 when the wiper blade 124 and the wiper blade 126 rotate.

Figure 4B:
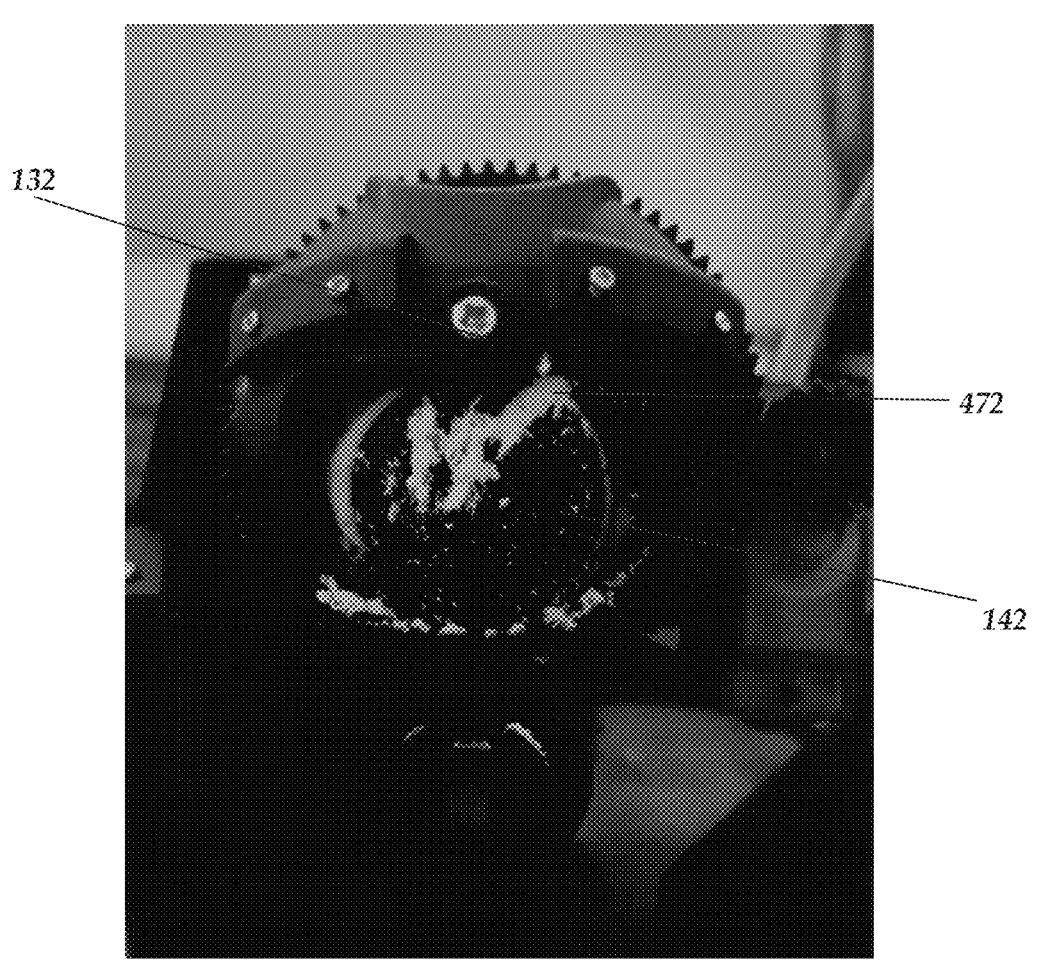
FIG. 4B is a photo showing portions of the lens cleaning system of FIG. 1 in accordance with some embodiments of the present disclosure.

FIG. 4B is a photo showing portions of the lens cleaning system 100 of FIG. 1 in accordance with some embodiments of the present disclosure. The photo 400 shows the housing 132 and the lens 142. The photo 400 further shows debris 472 attached to the lens 142. Based on the operations described with reference to FIGS. 1, 2, and 3, the lens cleaning system 100 can effectively remove the debris 472 from the lens 142.

Figure 5:
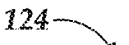
FIG. 5 shows a section side view of a portion of a wiper blade used in the lens cleaning system of FIG. 1 in accordance with some embodiments of the present disclosure.
Figure 5:
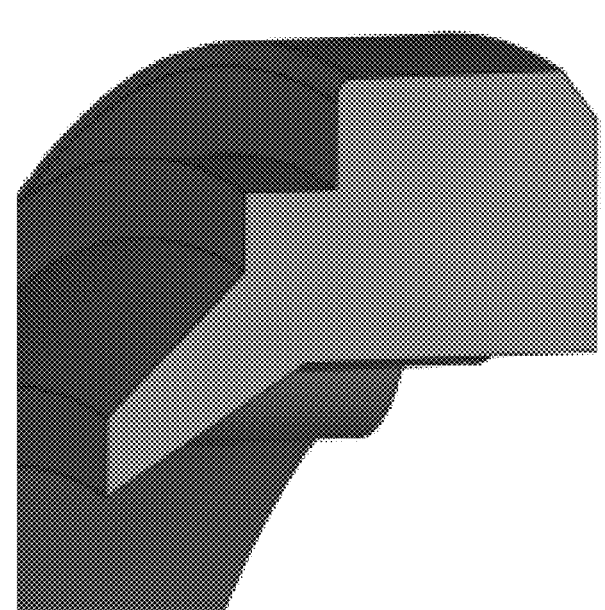

FIG. 5 shows a section side view of a portion of the wiper blade 124 used in the lens cleaning system 100 in accordance with some embodiments of the present disclosure. As noted above, the wiper blade 124 can be made of thermoplastic polyurethane (TPU), thereby achieving flexibility, durability, and/or chemical resistance associated with the wiper blade 124. The wiper blade 124 can be driven by the motor 122 to move across the lens 142. The wiper blade 124 can optionally incorporate spring-loaded mechanisms to maintain consistent pressure against the lens 142, thereby enhancing the effectiveness of the cleaning process triggered by the controller 150.

Figure 6:
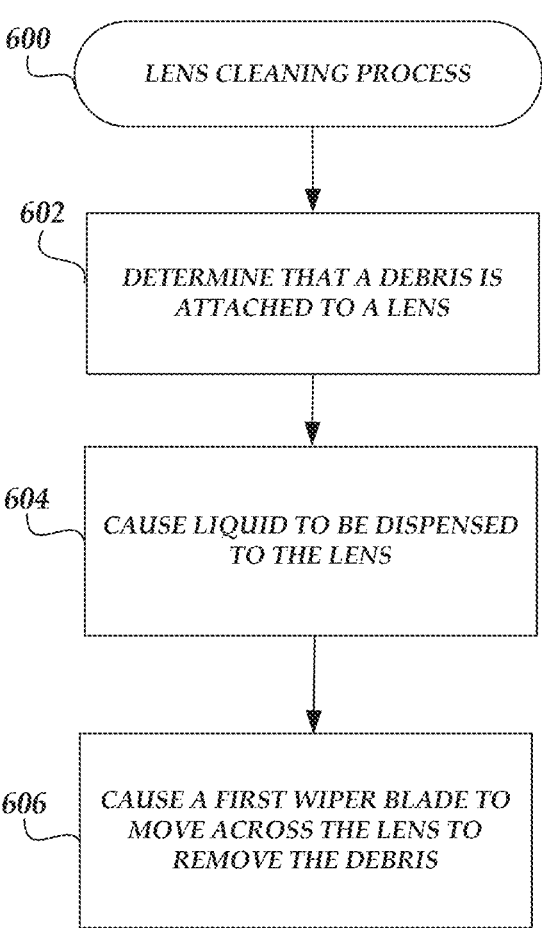
FIG. 6 is a flow diagram of an example lens cleaning process that can be used for cleaning a lens in accordance with embodiments of the present disclosure.

FIG. 6 is a flow diagram of an example lens cleaning process 600 (or simply referred to herein as a process) that can be used for cleaning the lens 142 of the lens cleaning system 100 in accordance with embodiments of the present disclosure. The blocks of the process 600 illustrate example implementations, and in various other implementations various blocks may be performed simultaneously and/or sequentially, rearranged, optional, omitted, and/or additional blocks may be added. The process 600 can be performed by the controller 150 of the lens cleaning system 100 to effectively clean debris (e.g., the debris 472) attached to the lens 142.

The process 600 begins at block 602. At block 602, the controller 150 can determine that debris is attached to a lens or that the lens is in need of cleaning. For example, the controller 150 can determine, based on image quality data generated by the camera assembly 140, that debris is attached to the lens 142. The image quality data can be generated by the camera assembly 140 through analysis (e.g., using machine learning models) of images captured by the camera assembly 140 through the lens 142.

At block 604, the controller 150 can cause liquid to be dispensed on the lens. For example, in response to determining that debris is attached to the lens 142, the controller 150 can cause the liquid stored in the reservoir 112 to be dispensed onto the lens 142 through the nozzle 202. In some examples, the controller 150 can cause or initiate sequential application of a solvent and oil for cleaning the lens 142. For example, the controller 150 can trigger a fluid dispensing assembly to spray a solvent-based cleaning fluid (e.g., washing fluid or alcohol-based solution) onto the lens 142. The solvent can be dispensed through the nozzle 202. The solvent can be sprayed to loosen and dissolve debris, such as dirt, dry salt, or other contaminants, that may be adhered to the lens 142. After the solvent is applied, the controller 150 can activate the motor 122 to move the wiper blade 124 across the lens 142 for removing the loosened debris and solvent from the surface of the lens 142. The controller 150 can further trigger the fluid dispensing assembly to apply a thin layer of oil onto the lens 142. As the oil is applied, the wiper blade 126 can move across the lens 142 to spread the oil into a thin, even film. This thin oil layer can serve as a protective barrier, reducing the adherence of future debris and contaminants to the surface of the lens 142.

At block 606, the controller 150 can cause a first wiper blade to move across a lens to clean the lens. For example, the controller 150 can cause (e.g., by activating the motor 122) the wiper blade 124 to move across the lens 142 to remove debris from the lens 142. In other examples, block 606 can be performed before block 604 is performed. For example, the controller 150 can cause the wiper blade 124 to move across the lens 142 prior to the nozzle 202 dispensing the liquid onto the lens 142. In this example, the wiper blade 124 can remove debris attached to the lens 142. Following the liquid (e.g., oil) being dispensed onto the lens 142, the controller 150 can further cause the wiper blade 126 to move across the lens 142 to remove excess oil, thereby ensuring image quality.

In some examples, the process 600 can be performed before and/or after a lens protection process that includes the following steps. For example, the controller 150 can determine, based on a first sensor signal indicative of an environment associated with the lens 142, that the lens 142 is prone to foreign object contact (e.g., when a vehicle that includes the lens cleaning system 100 is travelling over rough roads and/or at high speeds). In response to determining that the lens is prone to foreign object contact, the controller 150 can cause the wiper blade 124 and/or the wiper blade 126 to move across the lens 142 to remove any debris. The controller 150 can also close the housing 132 that houses the lens 142 to protect the lens 142 from damage caused by foreign objects.

In some examples, the controller 150 can further determine, based on a second sensor signal indicative of the environment associated with the lens 142, that the lens 142 is no longer prone to foreign object contact. For example, the second sensor signal can indicate that a vehicle that includes the lens cleaning system 100 is travelling over clean roads, and the lens 142 is no longer prone to foreign object contact. In response to determining that the lens 142 is no longer prone to foreign object contact, the controller 150 can cause the wiper blade 124 and/or the wiper blade 126 to move across the lens 142 (e.g., for wiping away any debris), and/or open the housing 132 to expose the lens 142. This can restore a camera view associated with the camera assembly 140.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

It is to be understood that not necessarily all objects or advantages may be achieved in accordance with any particular example described herein. Thus, for example, those skilled in the art will recognize that some examples may be operated in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, some acts, events, or functions of any of the algorithms described herein can be performed in a different sequence, can be added, merged, or left out altogether (for example, not all described acts or events are necessary for the practice of the algorithms). Moreover, in some examples, acts or events can be performed concurrently, for example, through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combination of the same, or the like. A processor can include electrical circuitry to process computer-executable instructions. In some examples, a processor includes an FPGA or other programmable device that performs logic operations without processing computer-executable instructions. A processor can also be implemented as a combination of computing devices, for example, a combination of a DSP and a microprocessor, a plurality of microprocessors, microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Conditional language such as, among others, "can," "could," "might" or "may," unless specifically stated otherwise, are otherwise understood within the context as used in general to convey that some examples include, while other examples do not include, some features, elements and/or steps. Thus, such conditional language is not generally intended to imply that features, elements and/or steps are in any way for examples or that examples necessarily include logic for deciding, with or without user input or prompting, whether these features, elements and/or steps are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that some examples require at least one of X, at least one of Y, or at least one of Z to each be present.

Any process descriptions, elements or blocks in the flow diagrams described herein and/or depicted in the attached figures should be understood as potentially representing modules, segments, or portions of code which include executable instructions for implementing specific logical functions or elements in the process. Alternate examples are included within the scope of the examples described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure.

Any process descriptions, elements or blocks in the flow diagrams described herein and/or depicted in the attached figures should be understood as potentially representing modules, segments, or portions of code which include executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system comprising:
a camera assembly comprising a lens;
a fluid dispensing assembly;
a wiper assembly housed by a housing, the wiper assembly comprising a first wiper blade and a second wiper blade; and
a controller in communication with the camera assembly, the fluid dispensing assembly, or the wiper assembly, the controller configured to:
trigger the fluid dispensing assembly to dispense liquid onto the lens;
cause the first wiper blade to move across the lens;
trigger the fluid dispensing assembly to dispense oil onto the lens after the first wiper blade has started to move; and
cause the second wiper blade to move across the lens to remove excess oil following dispensing the oil onto the lens.

2. The system of claim 1, further comprising:
the housing configured to house the lens, wherein the housing provides a ramp to enable the first wiper blade and the second wiper blade to smoothly move across the lens.

3. The system of claim 2, wherein the first wiper blade and the second wiper blade rotate along a rotation axis in either a clockwise direction or a counter-clockwise direction.

4. The system of claim 1, wherein the controller is further configured to cause, through an actuation mechanism, the housing to rotate into a position to cover the lens.

5. The system of claim 2, further comprising an environment sensor configured to detect an environment associated with the lens to generate a sensor signal, and wherein the controller is further configured to:
determine, based on the sensor signal, that the lens is prone to foreign object contact; and
in response to determining that the lens is prone to foreign object contact:
cause the first wiper blade to move across the lens; and
close the housing to cover the lens.

6. The system of claim 1, wherein the first wiper blade rotates in a one-way direction across the lens in a cleaning cycle.

7. The system of claim 1, wherein the fluid dispensing assembly comprises:
a reservoir configured to store the liquid;
a tube; and
a nozzle in fluid communication with the reservoir through the tube, the nozzle configured to spray the liquid onto the lens.

8. The system of claim 7, wherein the controller is further configured to:
determine, based on image quality data generated by the camera assembly, that a debris is attached to the lens,
wherein the controller triggers the fluid dispensing assembly and activates the wiper assembly in response to determining that the debris is attached to the lens.

9. The system of claim 1, wherein the liquid comprises oil, lubricant, alcohol-based solution, or washing fluid.

* * * * *